Oct. 18, 1960     F. L. FASANO     2,956,917
ARTICLE OF MANUFACTURE AND PROCESS OF MAKING SAME
Filed March 6, 1956

INVENTOR
FRANK L. FASANO

BY

AGENT

United States Patent Office 2,956,917
Patented Oct. 18, 1960

2,956,917

ARTICLE OF MANUFACTURE AND PROCESS OF MAKING SAME

Frank L. Fasano, Newburgh, N.Y., assignor to E. I. du Pont de Nemours and Company, Wilmington, Del., a corporation of Delaware Filed Mar. 6, 1956, Ser. No. 569,771

4 Claims. (Cl. 154—128)

This invention relates to coated loosely woven glass fabrics and particularly to a process of forming fire-resistant coatings on such fabrics.

Heretofore it has been practically impossible to coat loosely woven glass fabrics without distorting the pattern of the weave. Loosely woven glass fabrics are sleazy and when subjected to coating operations such as doctor knife coating, the pressure of the doctor knife against the coating being spread on the fabric causes the yarns to slide over each other and crowd together thus leaving a greatly enlarged and irregular interstices. Calender coating of such fabrics usually causes less distortion of the fabric, but this method has not been entirely satisfactory since the pressure required to calender the coating onto the glass fabric crushes and breaks a substantial proportion of the glass filaments in the yarn thus weakening the tensile strength. When the pressure is reduced in calender coating to prevent crushing and breaking off of the glass filaments the coating is not tightly adhered to the glass fabric.

An object of this invention is the provision of a vinyl resin coated glass fabric with improved adhesion of the coating to the glass fabric and a process of making same. A still further object is the application of a fire resistant vinyl resin coating on a loosely woven glass fabric without distorting or weakening the fabric. These and other important objects will become readily apparent as the description of the invention proceeds.

The objects of this invention are accomplished by impregnating a loosely woven glass fabric in a solution of a polyalkyl methacrylate and a vinyl resin polymer comprising predominately vinyl chloride, to set or adhere the glass yarns to each other and prevent distortion of the weave pattern, and laminating a preformed vinyl resin film onto said treated fabric by means of pressure.

Figure 1:
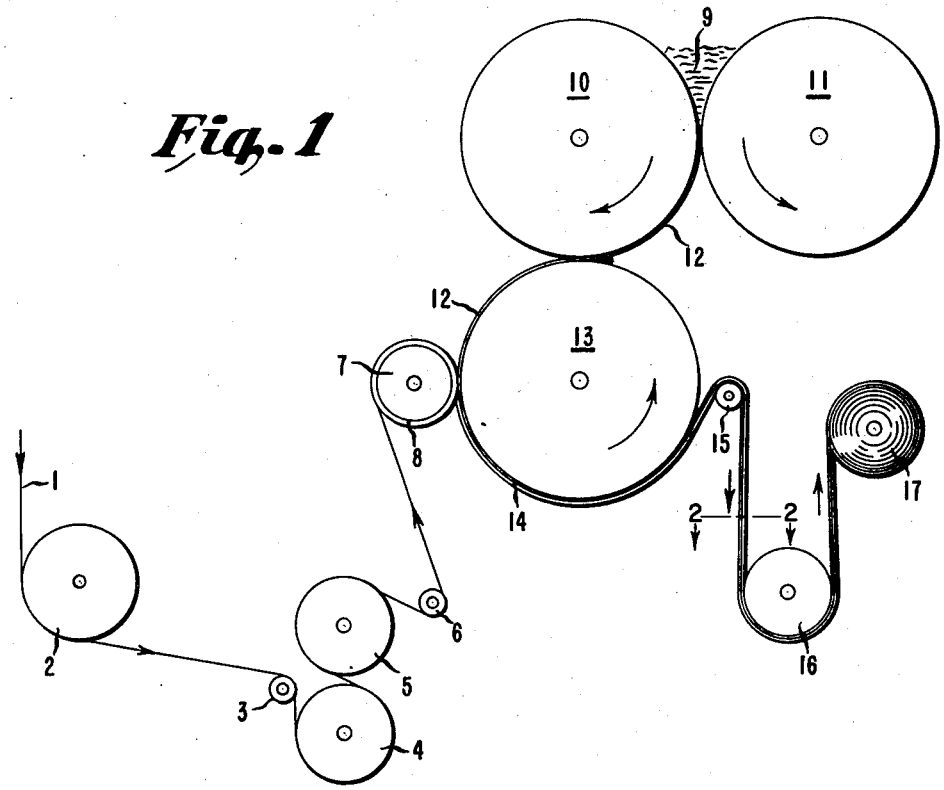
Figure 2:
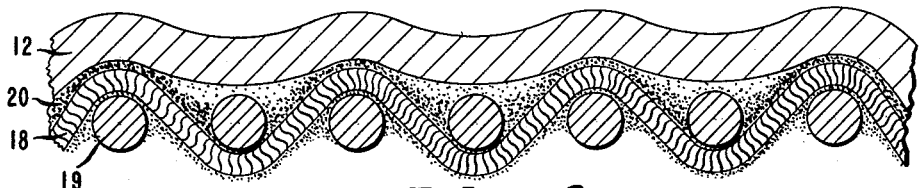

In the drawing Figure 1 is a diagrammatic side view of an apparatus suitable for carrying out the invention. Figure 2 is a greatly enlarged cross-sectional illustration of the finished product taken on line 2—2 of Figure 1, wherein 19 represents warp threads, 18 fill threads, 20 impregnating composition, and 12 a vinyl resin film.

In carrying out the invention, as illustrated by the drawing, a previously impregnated loosely woven glass fabric 1 from an unbatch (not shown) is passed around driven roll 2, around guide roll 3, around drums 4 and 5 having a diameter of about 15 inches which are heated to about 330° F. The impregnant 20 is heated sufficiently to become softened. The glass fabric with softened impregnant 20 is passed around roll 7 having a rubber sleeve 8 of a durometer hardness of 50–90 which presses the heated impregnated glass fabric against film 12 on calender roll 13. The pressure applied on the film 12 and impregnated glass fabric 1 is about 70 p.s.i. The film 12 is formed from compound 9 introduced into the nip of revolving calender rolls 10 and 11 (about 32" diameter) heated to about 320–335° F. A film 12 is formed on roll 10 which passes through the nip of rolls 10 and 13 which are set to allow a film about .012" to pass between. The calender roll 13 is heated to about 330° F. The pressure applied by roll 7 on the hot impregnated glass fabric 1 pressing against film 12 is sufficient to cause the impregnated glass fabric 1 and film 12 to become welded together without crushing the glass yarns 18 and 19. The film 12 laminated to the impregnated glass fabric shown as 14 is passed around guide rolls 15 and 16 to batch up 17.

The parts and percentage figures throughout the specification are expressed on a weight basis unless stated otherwise. The following specific examples are given by way of illustration and not limitation.

*Example I*

A loosely woven glass fabric having the following specification:

| | |
|---|---|
| Thickness, inches | .0043. |
| Weight, oz./sq. yd. | 2.48. |
| Width, inches | 56. |
| Weave pattern | Plain (one over one). |
| Thread count per inch (warp x filler) | 32 x 28. |
| Type of yarn | 150–1/0 (single ply yarn 150 x 100 yds./lb.). | was dip coated in the following impregnating composition:

| | Percent by weight |
|---|---|
| "Vinylite" VMCH | 4.0 |
| Polymethyl methacrylate | 1.0 |
| Chlorinated paraffin (42% chlorine) | 2.0 |
| Methyl ethyl ketone | 93.0 |

The "Vinylite" VMCH resin in the above formula was a tripolymer, the approximate composition of which varies within the following limits:

| | Percent by weight |
|---|---|
| Vinyl chloride | 80.0–90.0 |
| Vinyl acetate | 19.7–17.0 |
| Maleic acid (similar alpha beta olefinic unsaturated carboxylic acid also useful) | .3–3.0 |

The "Vinylite" VMCH resin may be produced in accordance with the teaching set forth in U.S. Patent 2,329,456, issued September 14, 1953, to William E. Campbell, Jr. and the limitations set forth in the disclosure of that patent apply here.

The glass fabric picked up sufficient composition to deposit approximately .3 oz. dry coating of nonvolatile components per yard 56" wide. After removal of the volatile solvent by forced drying from the composition deposited throughout the glass fabric, the fabric was somewhat stiffer and not subject to distortion when handled in a manner employed in the coating of fabrics. Care must be taken to prevent distortion of the weave pattern during the impregnating and drying.

The treated fabric was further processed by laminating a calendered film onto the treated glass fabric, as illustrated in the drawing.

The formula of the calender film was as follows:

| | Percent by weight |
|---|---|
| "Vinylite" VYNW (polymer derived from 95 parts vinyl chloride and 5 parts vinyl acetate) | 42.03 |
| Calcium carbonate | 14.70 |
| Antimony oxide | 14.70 |
| Mixture of cadmium and barium salts of fatty acid (stearic) | 1.26 |
| Epoxidized soya oil ("Paraplex" G-62) | 2.10 |
| 2 ethyl hexyl diphenyl phosphate ("Santicizer" 141) | 16.81 |
| Colored pigment | 4.62 |
| Di(2 ethyl hexyl) phthalate | 3.78 |

The above composition was thoroughly mixed in a Banbury mixer then transferred to the nip of the calender rolls heated to about 325° F. as illustrated in the drawing. A film of approximately .012 inch thickness was formed on one bottom roll of the calender as illustrated in the drawing. The previously treated glass fabric is then rolled against the hot film mounted on the revolving calender roll by means of a revolving pressure roll covered with a rubber sleeve about 1.5 inches thick of approximately 50-90 durometer hardness.

Care must be taken at the laminating step to prevent the application of too much pressure which will crush and break the glass filaments in the fabric base thus reducing the tensile strength. If the pressure is too low, satisfactory bond between the treated glass fabric and the preformed film is not accomplished. The polymeric alkyl methacrylate/vinyl chloride polymer impregnating composition is formulated to accomplish a firm bond between the treated glass fabric and the preformed film at a pressure which will not crush or break the glass filaments.

The impregnated glass fabric with the adherent preformed film is embossed by passing it under a source of radiant heat to soften the surface film and while the film is in the softened condition it is passed between an unheated engraved steel roll and a rubber covered backing roll, the two rolls being under slight pressure. The opposite of the design on the engraved steel roll is transferred to the surface film.

The above example was repeated using the following impregnating compositions in place of that described above in preparing Examples II, III, IV, and V.

| Examples | II | III | IV | V |
| --- | --- | --- | --- | --- |
| 50/50 Blend "Geon" 202 [1] and "Vinylite" VYHH [2] | 4.0 | | | |
| "Vinylite" VYHH [2] | | 4.0 | | |
| "Geon" 202 [1] | | | 4.0 | |
| "Geon" 101 [3] | | | | 4.0 |
| Polymethyl Methacrylate | 1.0 | 1.0 | 1.0 | 1.0 |
| Methyl Ethyl Ketone | 95.0 | 95.0 | 95.0 | 95.0 |

[1] "Geon" 202 is a copolymer of about 80 parts of vinyl chloride and 20 parts of vinylidene chloride.
[2] "Vinylite" VYHH is a copolymer of about 85-87 parts of vinyl chloride and 15-13 parts of vinyl acetate.
[3] "Geon" 101 is an unmodified polymer of vinyl chloride.

The adhesion of the preformed vinyl film to the impregnated glass fabric in Examples I-V was measured in accordance with the Method 5970 of Federal Specification CCC-T-191b for "Textile Test Methods," dated May 15, 1951. The results were as follows:

| Example | Adhesion of Film to Impregnated Fabric 2" Strip |
| --- | --- |
| I | The 3.5 lbs. in Warp and filler. Fabric tore during test.[1] |
| II | 4.6 lbs. Warp—4.2 lbs. Filler. |
| III | 3.9 lbs. Warp—3.0 lbs. Filler. |
| IV | 3.0 lbs. Warp—3.6 lbs. Filler. |
| V | 3.4 lbs. Warp—3.4 lbs. Filler. |

[1] In this test the fabric tore unevenly at 3.5 lbs. pull before the film was pulled away due to the high adhesion of coating of the fabric.

In the preferred embodiment, as exemplified by the examples, the ratio of the polymethyl methacrylate to the vinyl chloride polymer and copolymers is 20 to 80. Useful weight ratios of the vinyl chloride resin to the polyalkyl methacrylate resin vary from 50:50 to 90:10.

In place of the polymethyl methacrylate in the specific examples it is to be understood that other polyalkyl methacrylates are useful in carrying out this invention such as, e.g., those in which the alkyl group contains 1 to 8 carbon atoms. In the interest of brevity a specific example illustrating each polymeric alkyl methacrylate that may be blended with the vinyl chloride resin in preparing the impregnating composition is not given. It will be understood that the polymeric alkyl methacrylates having 2 to 8 carbon atoms in the alkyl group are substitutable in the above formula of the impregnating compositions for the polymethyl methacrylate on a pound for pound basis.

The vinyl chloride resins in the impregnating composition and the preformed film may be selected from a variety of vinyl chloride polymers and copolymers, including copolymers of vinyl chloride and other ethylenically unsaturated monomers such as e.g., diesters of fumaric or maleic acid including dimethyl, diethyl, dipropyl or dibutyl fumarate or maleate; copolymers of vinyl chloride and esters of acrylic or methacrylic acids; copolymers of vinyl chloride and vinylidene chloride; copolymers of vinyl chloride and vinyl esters such as, e.g., vinyl acetate; as well as the homopolymer of vinyl chloride. The vinyl resin in the impregnating composition can be the same as or different from that in the preformed films. In the case of the vinyl chloride copolymer resins the vinyl chloride is present in preponderant amounts, i.e. not less than about 75% of the total polymer composition. In the claims the term "vinyl chloride resin" includes the homopolymer and copolymers mentioned above.

There is no particular limit to be placed on the amount of impregnating composition deposited in and on the glass fabric. Also there is no specific limit to be placed on the thickness of the preformed vinyl chloride resin film laminated to the impregnated fabric. For practical limitations the amount of the impregnating composition may vary between .05 and .6 ounce per square yard.

By the term "loosely woven" glass fabric is meant a fabric which distorts by normal handling and having a thread count of about 20 to 60 threads per inch in both the warp and filler directions, and a yarn size of about that equivalent to a 150 yarn (150 x 100 yards per pound). Glass fabrics having 150 yarn and thread count lower than about 20 threads per inch in both the warp and filler directions are too loose and open for coating in accordance with this invention.

The procedures described above provide a method of coating loosely woven glass fabrics which can not be coated with conventional techniques without distorting or reducing the tensile strength by crushing glass filaments making up the yarns of the fabric. The preformed film can be laminated to both sides of the impregnated glass fabric.

The products of this invention are fire resistant and are particularly adapted for constructing folding doors that collapse as an accordion.

While there are above disclosed but a limited number of embodiments of the structure, process and product of the invention herein presented, it is possible to produce still other embodiments without departing from the inventive concept herein disclosed and it is desired therefore that only such limitations be imposed on the appended claims as are stated therein, or required by the prior art.

The embodiments of the invention in which an exclusive property or privilege is claimed are defined as follows:

1. An article of manufacture comprising a loosely woven glass fabric impregnated throughout with a flexible composition comprising a polyalkyl methacrylate having 1 to 8 carbon atoms in the alkyl group and a vinyl chloride containing resin as the principal film forming ingredients, and a strongly adherent performed flexible surface film on at least one side of said inpregnated fabric comprising a vinyl chloride resin as the principal film forming ingredient.

2. The product of claim 1 in which the polyalkyl methacrylate is polymethyl methacrylate.

3. The product of claim 1 in which the glass fabric is impregnated with a blend of polymethyl methacrylate and a copolymer of about 80-90 parts vinyl chloride, 19.7 to 17.0 parts of vinyl acetate and .3 to 3.0 parts of maleic anhydride and the preformed surface film comprises a copolymer of vinyl chloride and vinyl acetate.

4. Process of coating a loosely woven glass fabric comprising impregnating a loosely woven glass fabric with a liquid composition which is flexible when dry comprising a solution of a polymeric alkyl methacrylate having 1 to 8 carbon atoms in the alkyl group, a vinyl chloride resin and a volatile solvent for said polymers, evaporating a substantial portion of the volatile solvent, laminating a heated preformed flexible film comprising a vinyl chloride resin as the principal film forming component to the impregnated fabric by pressing the impregnated fabric against the film whereby the pressure is sufficient to affect a strong bond, but insufficient to crush the glass yarns.

References Cited in the file of this patent

UNITED STATES PATENTS

| | | |
|---|---|---|
| 2,204,859 | Hyatt et al. | June 18, 1940 |
| 2,537,126 | Francis | Jan. 9, 1951 |
| 2,545,832 | Wagers | Mar. 20, 1951 |
| 2,550,465 | Gorski | Apr. 24, 1951 |
| 2,744,044 | Toulmin | May 1, 1956 |

FOREIGN PATENTS

| | | |
|---|---|---|
| 546,469 | Great Britain | July 15, 1942 |